United States Patent [19]

Campbell

[11] Patent Number: 5,062,617
[45] Date of Patent: Nov. 5, 1991

[54] SHOCK ABSORBING SUPPORT POST

[75] Inventor: Raymond D. Campbell, Smith Falls, Canada

[73] Assignee: Camberfield Manufacturing Limited, Smith Falls, Canada

[21] Appl. No.: 480,769

[22] Filed: Feb. 15, 1990

[30] Foreign Application Priority Data

Jul. 11, 1989 [CA] Canada .................................. 605298

[51] Int. Cl.⁵ .............................. B62J 1/02; F16F 1/00
[52] U.S. Cl. .................................. 267/132; 248/600; 267/178
[58] Field of Search ............... 267/132, 131, 166, 170, 267/117, 178, 179, 286, 70, 71, 69, 74; 248/600, 599, 623; 297/209, 208, 211; 280/220

[56]      References Cited
       U.S. PATENT DOCUMENTS

| 576,328 | 2/1897 | Spaulding | 267/117 |
|---|---|---|---|
| 591,840 | 10/1897 | Hakes | 248/600 |
| 904,034 | 11/1908 | Whitlow | 248/599 X |
| 1,457,241 | 5/1923 | Williams | 267/132 |
| 1,880,181 | 9/1932 | Turner | 248/599 |
| 2,048,148 | 7/1936 | Stoll | 248/600 X |
| 2,167,912 | 8/1939 | Schwinn | 297/209 |
| 2,272,344 | 2/1942 | Kimbro | 248/600 X |
| 2,467,676 | 4/1949 | Labihe | 297/211 |
| 2,516,801 | 7/1950 | Renand | 248/600 |
| 2,566,387 | 9/1951 | Vick . | |
| 2,644,504 | 7/1953 | Vick | 267/132 X |
| 2,664,941 | 1/1954 | Gillespie | 248/600 X |
| 2,680,472 | 6/1954 | Hempe, Jr. | 267/132 X |
| 2,964,094 | 12/1960 | Gariepy | 248/600 X |
| 3,116,089 | 12/1963 | Banzhaf | 267/132 X |
| 3,229,954 | 1/1966 | Hendricks . | |
| 3,481,628 | 12/1969 | Brilando et al. | 297/209 X |
| 3,572,621 | 3/1971 | Whitten et al. | 248/600 X |
| 3,891,236 | 6/1975 | Kuwano et al. | 267/132 X |
| 3,989,263 | 11/1976 | Stuck et al. | 248/600 X |
| 4,077,619 | 3/1978 | Borlinghaus | 267/166 X |
| 4,111,407 | 9/1978 | Stager | 267/166 |
| 4,120,489 | 10/1978 | Borlinghaus | 267/166 X |
| 4,150,851 | 4/1979 | Cienfuegos . | |
| 4,182,508 | 1/1980 | Kallai et al. . | |
| 4,455,010 | 6/1984 | Butler | 248/600 X |
| 4,736,983 | 4/1988 | Furbee | 248/600 X |

FOREIGN PATENT DOCUMENTS

| 73460 | 10/1901 | Canada . | |
|---|---|---|---|
| 434486 | 4/1946 | Canada . | |
| 477755 | 10/1951 | Canada . | |
| 498093 | 12/1953 | Canada . | |
| 515835 | 8/1955 | Canada . | |
| 982468 | 1/1976 | Canada . | |
| 0660574 | 5/1987 | Switzerland | 267/132 |

Primary Examiner—Douglas C. Butler
Attorney, Agent, or Firm—Dickstein, Shapiro & Morin

[57]         ABSTRACT

There is provided a new and useful shock absorbing support post for a bicycle seat comprising a tubular member having top and bottom ends, a shock absorber within the tubular member, an elongated cylindrical stem partially within and in sliding engagement with the tubular member, a first end of the stem engaging the shock absorber and a second end of the stem extending outwardly of the tubular member, a stop limiting the range of sliding movement of the stem relative to the tubular member, and a stop for maintaining a predetermined resting force between the stem and the shock absorber.

11 Claims, 2 Drawing Sheets

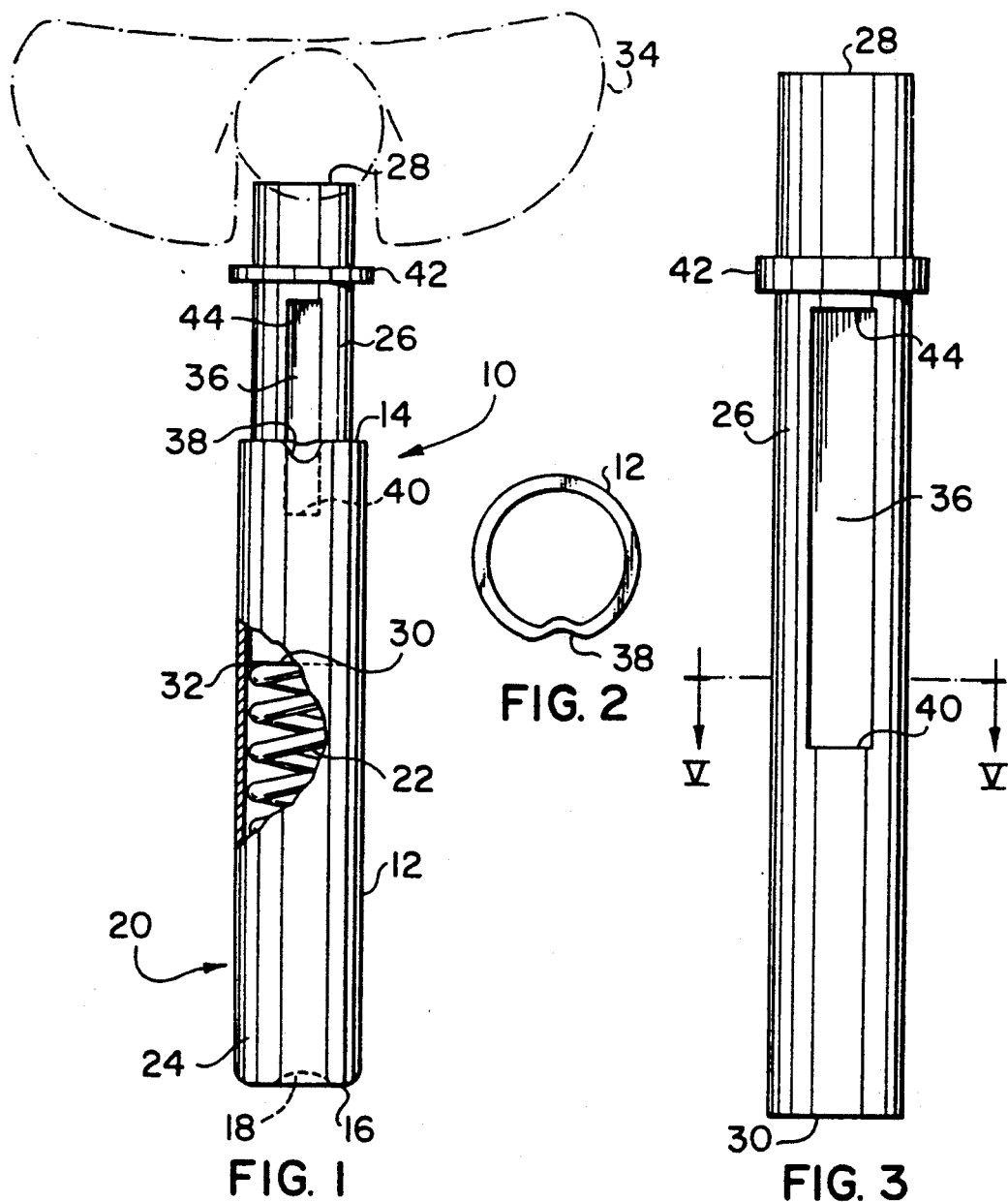

SHOCK ABSORBING SUPPORT POST

This application relates to shock absorbing support posts for seats. One preferred application of the present invention is with bicycle seats.

BACKGROUND OF THE INVENTION

While the shock absorbing support post of the present invention can be incorporated into a variety of vehicles for recreational and other uses, the invention is particularly applicable to bicycles, and it will be primarily described in that context.

Bicycles even in modern configurations have been widely used for a great many years. More recently an increase in awareness of bicycling as an aid in maintaining physical fitness and the response of authorities in providing pathways specifically constructed and/or set aside for bicycling have led to a very strong resurgence in the sport. This in turn has led to an increase in development of types of bicycles and of accessories and equipment for use with and/or on bicycles.

An area which has not received a great deal of attention or in which development has not led to major improvement is bicycle seating. Particularly for recreational bicyclists who use their bicycles, for example, only on weekends, the lack of comfort of the bicycle seat remains a major and general cause of complaint.

It is likely that certain inherent aspects of bicycle seats which are dictated by the nature of bicycles will remain troublesome to occasional riders. These include the limitations on the size and shape of the seat.

An important contributor to discomfort for occasional bicycle riders is the jarring impact encountered in traversing obstacles such as dips or breaks in the surface upon which the bicycle is being ridden.

As well, in bicycle touring the addition to the bicycle of various filled baggage containers puts a substantial extra stress on frame and wheels which can result in breakdowns, particularly when traversing obstacles as above.

The present invention provides a shock absorbing support post for a bicycle seat or other seats as appropriate which markedly reduces the discomfort to the rider and the probability of breakdown of the bicycle arising out of the vertical movement of the bicycle in traversing obstacles, bumps and the like. In its preferred form the invention is configured to replace a conventional bicycle seat post without modification to the bicycle or the bicycle seat.

PRIOR ART

To date no practical system or device for absorbing shock in a bicycle seat post has been proposed.

Canadian Patent 73,460, granted October, 1901, to Jarvis, provides a very complex seat with seat back for use on a style of bicycle in which the rider is in a semi-prone position. Provision is made for vertical oscillation of the seat and for cushioning of that movement by the use of a spring inserted into the bicycle frame.

Canadian Patent 434,486, issued Apr. 30, 1946, to Indian Motorcycle Company, illustrates an apparatus for cushioning a motorcycle seat.

Canadian Patent 477,755, issued Oct. 16, 1951, to Gillespie, illustrates a shock absorbing apparatus for a tractor seat.

Canadian Patent 498,093, issued Dec. 1, 1953, to General Tire & Rubber Company, illustrates a further shock absorbing apparatus for a tractor seat.

Canadian Patent 515,835, issued Aug. 23, 1955, illustrates a further and rather complicated shock absorbing system for a tractor seat.

Canadian Patent 982,468, issued Jan. 27, 1976, to Showa Manufacturing Co., illustrates an apparatus which permits a bicycle seat to be lowered when stopped, as at an intersection, and raised when again starting off.

None of these prior devices offer the simplicity or adaptability of the present invention.

BRIEF SUMMARY OF THE INVENTION

A shock absorbing seat support post has now been developed which serves to alleviate part of the discomfort which heretofore appertained to seats such as those used on bicycles. The device is compact and simple in construction and can in many cases be substituted for conventional seat support posts with no modification required.

The device comprises a minimum of components and is very durable. Thus, the invention provides a shock absorbing support post for a seat comprising a tubular member having top and bottom ends, shock absorbing means within the tubular member, an elongated cylindrical stem partially within and in sliding engagement with said tubular member, a first end of the stem engaging the shock absorbing means and a second end of the stem extending outwardly of the tubular member, means limiting the range of sliding movement of the stem relative to the tubular member, and means for maintaining a predetermined resting force between the stem and the shock absorbing means.

In a preferred embodiment the invention comprises a self-contained shock absorbing support post for replacing a conventional bicycle seat support post and comprising a tubular member having top and bottom ends and adapted to be inserted bottom end first into and secured within a conventional tubular bicycle frame, shock absorbing means within and toward the bottom end of the tubular member, an elongated cylindrical stem partially within and in sliding engagement with said tubular member, a first end of the stem engaging the shock absorbing means and a second end of the stem extending outwardly of the top end of the tubular member, means limiting the range of sliding movement of the stem relative to the tubular member, and means for maintaining a predetermined resting force between the stem and the shock absorbing means.

BRIEF DESCRIPTION OF THE DRAWINGS

In drawings which illustrate embodiments of the invention,

FIG. 1 is a side view partially cut away of a support post according to the invention;

FIG. 2 is a plan view of a tubular member utilized in the invention;

FIG. 3 is a side view of a cylindrical stem utilized in the invention;

FIG. 4 is a plan view of the stem of FIG. 3;

FIG. 5 is a cross section through the stem of FIG. 3;

Figure 6:
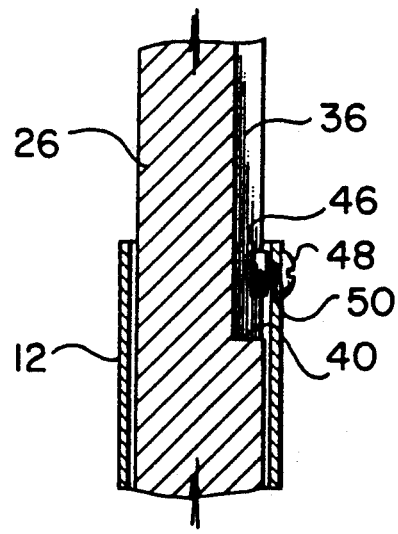
FIG. 6 is a cross section of part of a post according to the invention illustrating a further embodiment.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

The support post 10 includes a tubular member 12 having an upper or top end 14 and a lower or bottom end 16.

The tubular member 12 is preferably of chromed or stainless steel. The bottom 16 of member 12 is preferably bent or crimped inwardly as at 18.

A shock absorbing means 20 is located within the tubular member 12 and preferably toward the bottom 16 thereof.

In its preferred form the shock absorbing means 20 comprises at least one spring 22. Spring 22 at its lower end 24 brings up against the crimped area 18 at the bottom 16 of tubular member 12. The spring 22 is thus prevented from exiting the tubular member 12 at the bottom 16.

In the preferred embodiment the spring 22 is a cylindrical compression spring. The spring may have a first section of lesser spring force and a second section of greater spring force. The benefit of such a spring is addressed later. In another alternative, a pair of springs having differing compression forces may be utilized one above the other to accomplish the same effect.

A typical single spring which has been found suitable is one about 6.01 inches long, having 24 coils and an outside diameter of about 0.835 inches. Such a spring was heat treated at 450° F. and was rated at 63.3 pounds per square inch. The steel used was 0.135AS20.

Similarly, other forms of shock absorbers could be utilized, but it is generally considered that the least complicated and most economically attractive type is the spring or springs discussed above.

A cylindrical plunger or stem 26 has an upper or top end 28 and a lower or bottom end 30. The diameter of stem 26 is chosen to permit stem 26 to slide within tubular member 12. Thus, the bottom end 30 of stem 26 is inserted into member 12 to engage the upper end 32 of the spring 22 (or other shock absorbing means 20).

Three functional requirements of the support post may be met by a single structural expedient. These functional aspects are as follows. First, the stem 26 must be limited in upward movement relative to the tubular member 12 to prevent withdrawal of the stem from the tube. The lower limit of movement of the stem 26 in normal use is preferably defined by a predetermined degree of compression of the spring 22.

Second, it is preferable that there be no or little noticeable movement of the seat when a person simply mounts or dismounts. Accordingly, it is desirable that such a degree of force be maintained on the shock absorber 20 in the rest (user dismounted) position that the normal mounting action will cause little movement of the shock absorber and hence of the seat. This is preferably achieved in the preferred spring usage by preventing the stem 26 from rising sufficiently in the member 12 to allow complete release of the spring 22. The stem is maintained in a rest position in which spring 22 remains compressed to a predetermined required extent, which may be adjustable for different rider weights.

Third, the stem 26 should be restrained against rotation within the tubular member 12. This is required for good stability.

Each of the above three objectives can be achieved by utilizing a keyway, or slot, and key arrangement. Thus, a keyway or slot 36 is formed in the stem 26. In one preferred embodiment a key in the form of an inwardly depressed area 38 is formed in the tubular member 12 to mate with the keyway 36. The key and keyway combination prevents rotation of stem 26 relative to tubular member 12. As well, the key 38 will abut against the end 40 of slot 36 to limit the upward movement of stem 26. Furthermore, the position of the end 40 of slot 36 can be chosen to permit the stem 26 to move upwardly only to a position where the required rest compression force will be applied as between the shock absorbing means 20 and the stem 26.

In a further preferred embodiment, the key comprises a nut 46 positioned for relative sliding movement in keyway 36. A bolt 48 passes through an opening 50 provided for the purpose in tubular member 12 to secure the nut 46 in position. The nut 46 then functions in the same manner as depressed area 38 described above.

Figure 7:
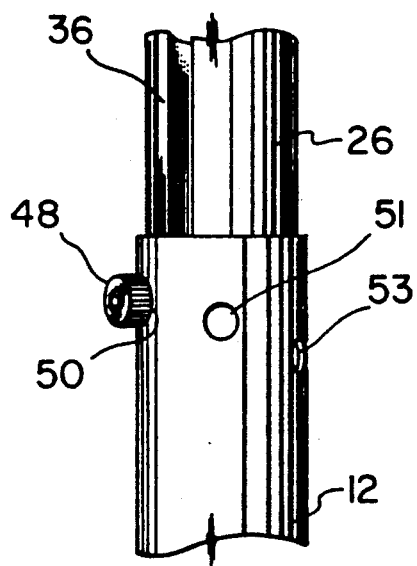
FIG. 7 illustrates one method of adjusting compression on the apparatus of the invention in the rest position.

FIG. 7 illustrates an embodiment in which three openings 50, 51 and 53 are provided in tubular member 12 at different levels. The particular opening to be used in any given case can be chosen based on the weight of the rider. Thus, a lighter rider would choose opening 50; an intermediate rider, opening 51; and a heavy rider, opening 53, to obtain the preferred degree of rest tension. The openings 50, 51 and 53 are preferably spaced at 120° intervals around tubular member 12.

The same advantage could be achieved by utilizing a series of three slots 36 spaced about stem 26 and having their bottoms 40 at the required different levels.

In use in a bicycle the tubular member 12 is slid into the tubular bicycle frame in the manner in which a seat support post is conventionally so inserted. The level of the top 14 of the tubular member 12 would be set in accordance with the seat height preference of the individual rider. Conventionally, at least three inches of the post should extend into the bicycle frame and that applies to the present case.

A collar 42 or a similar stop is preferably provided on the stem 26 to protrude to an extent that it would bring up against the tubular bicycle frame to prevent the support post 10 from accidentally sliding entirely into the bicycle frame prior to being secured. Collar 42 will also provide a limit to the extent that seat 34 can be slid onto stem 26 to thus prevent contact between the seat proper and the stem.

Once the tubular member 12 is secured in the bicycle frame, a bicycle seat 34 is secured adjacent the top 28 of stem 26.

The preferred material for the tubular member 12 is chromed steel. The tubular member 12 in a typical embodiment would be about 8 ½ inches long.

Where a spring shock absorber is utilized, the spring is preferably about 6 inches in length and with a compression force which will vary depending on the particular use. For example, use in an adult bicycle would require higher force than use in a child's bicycle.

The compression force is chosen to typically allow about 2 inches maximum travel for the stem 26.

The positioning of the upper end 44 of slot 36 is not important other than that it must allow for the required travel of stem 26. The extent of travel will vary with spring strength but typically may be in the two inch range.

The stem 26 is preferably a thermoplastic of the self-lubricating type. A preferred material is sold under the trade mark Delrin of E. I. du Pont de Nemours & Co. Typically the stem 26 would have a length of about 7 inches. A typical diameter for stem 26 would be about $\frac{5}{8}$ inch.

Thus it is apparent that there has been provided in accordance with the invention shock absorbing support posts for seats that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A shock absorbing support post for a seat comprising:
   a tubular member having top and bottom ends;
   shock absorbing means within said tubular member;
   an elongated cylindrical stem partially within and in sliding engagement with said tubular member, a first end of said stem engaging said shock absorbing means and a second end of said stem extending outwardly of said tubular member;
   means limiting the range of sliding movement of said stem longitudinally relative to said tubular member;
   means restraining said stem against rotation in said tubular member; and
   means for maintaining a predetermined resting force between said stem and said shock absorbing means, said means limiting, said means restraining and said means for maintaining comprising a longitudinally extending slot or keyway having upper and lower ends in said stem and a mating key in said tubular member and wherein said key and said keyway are positioned such that said lower end of said keyway brings up against said key to thereby stop sliding movement of said stem at a point where said predetermined resting force exists between said shock absorbing means and said stem.

2. The support post of claim 1 wherein said shock absorbing means is a compression spring.

3. The support post of claim 2 wherein said spring includes a first section of a lesser predetermined force and a second section of a greater predetermined force.

4. The support of claim 1 wherein said shock absorbing means is a spring slidable within said tubular member and wherein said tubular member includes stop means preventing expulsion of said spring through said bottom end.

5. The support post of claim 4 wherein said stop means comprises at least partial closure of said bottom end of said tubular member.

6. The support post of claim 1 wherein said key comprises an inwardly depressed area of said tubular member.

7. A self-contained shock absorbing support post for replacing a conventional bicycle seat support post and comprising:
   a tubular member having top and bottom ends and adapted to be inserted bottom end first into and secured within a conventional tubular bicycle frame;
   shock absorbing means within and toward said bottom end of said tubular member;
   an elongated cylindrical stem partially within and in sliding engagement with said tubular member, a first end of said stem engaging said shock absorbing means and a second end of said stem extending outwardly of said top end of said tubular member for attachment to a conventional bicycle seat;
   means limiting the range of sliding movement of said stem longitudinally relative to said tubular member;
   means restraining said stem against rotation in said tubular member; and
   means for maintaining a predetermined resting force between said stem and said shock absorbing means, said means limiting, said means restraining, and said means for maintaining comprising a longitudinally extending slot or keyway having upper and lower ends in said stem and a mating key in said tubular member and wherein said key and said keyway are positioned such that said lower end of said keyway brings up against said key to thereby stop sliding movement of said stem at a point where said predetermined resting force exists between said shock absorbing means and said stem.

8. The support post of claim 7 including stop means on said stem to limit the extent of entry of said tubular member into said bicycle frame.

9. The support post of claim 8 wherein said key comprises a nut adapted for relative sliding movement in said keyway, said nut secured by a bolt extending radially through an opening in the sidewall of said tubular member.

10. The support post of claim 9 wherein said sidewall includes at least two openings therethrough spaced longitudinally whereby said nut may be secured at different longitudinal positions of said tubular member.

11. The support post of claim 7 wherein said shock absorbing means is at least one compression spring.

* * * * *